Patented Oct. 27, 1936

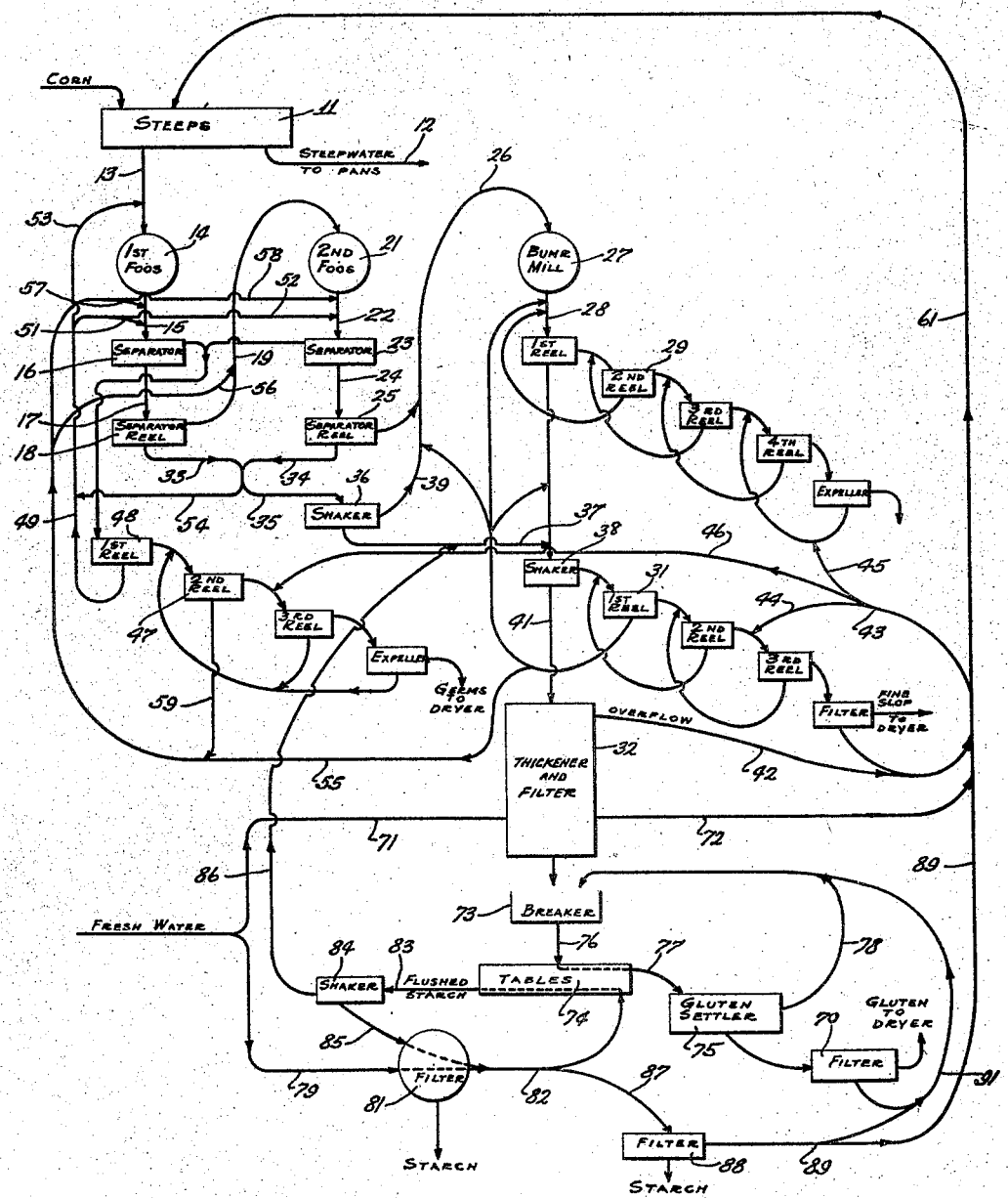

2,058,683

UNITED STATES PATENT OFFICE 2,058,683

MANUFACTURE OF STARCH

Robert Edman Greenfield, Decatur, Ill., assignor to A. E. Staley Manufacturing Company, Decatur, Ill., a corporation of Delaware Application September 23, 1932, Serial No. 634,558
Renewed September 13, 1935

9 Claims. (Cl. 127—69)

This invention relates to the manufacture of starch from corn and has more particular reference to improvement in the handling and use of the waters employed in effecting the separation of the starch from the other ingredients, and to the recovery of the solubles.

The manufacture of starch from corn is accomplished fundamentally by water separation and flotation operations and heretofore has consisted generally in first soaking or steeping the corn, then breaking up the kernels so that the corn germs may be removed from the starch bearing materials; thereafter grinding the starch bearing materials to separate the starch and gluten from the bran and fibrous parts and finally separating the starch and the gluten. All of these operations are carried on with the use of large quantities of water employed to convey the corn during its disintegration through the various grinding mills, screening reels, filters, etc., and with the use also of a large amount of water to permit a gravity separation of the starch and gluten and the floating off of the gluten for separate disposition.

The corn contains a substantial percentage of soluble material in addition to the insoluble germs, fibers, starch, and gluten. The soluble components must, of course, be removed from the starch and should be recovered from the waters dissolving them since they are advantageously usable in the manufacture of stock feed. After removal of the germs the remainder of the corn kernels is ground in suitable mills and the grind is successively passed through sieves or screens to separate the bran and fibrous materials from the starch and gluten, this bran and fibrous material being known generally in the industry as slops.

The separation of the slops from the starch milk (water containing starch and gluten) is best and most economically accomplished when a definite volume of water per bushel of corn ground is maintained. Likewise the separation of the gluten from the starch is best and most advantageously accomplished when a predetermined definite volume of water per bushel of corn ground is used in the separation.

Also in the manufacture of starch from corn it is desirable that the water used in the several operations be conserved and returned to the system in order that the solubles may be concentrated for recovery and a minimum amount of water be needed.

The principal object of this invention is the provision of a process for the manufacture of starch from corn which, while returning the various waters for reuse in the process, will permit of separate and independent control of the volumes of water used in the mill house to separate the slops from the starch milk, and in the table house to separate the starch from the gluten. Moreover, in the manufacture of starch from corn it is desirable that separate control be possible in the mill house and at the starch tables, first of the temperatures of the waters and second of their sulphur dioxide concentration.

The invention contemplates a closed water system for the mill house and through the steeps, which is separate from a closed water system provided for the separation of the gluten from the starch.

Another object of the invention is the removal of all or substantially all of the solubles before tabling the starch in order that opportunity for fermentation at the tables may be prevented or minimized and starch of improved quality produced.

Numerous other objects and advantages of the invention will be apparent as it is better understood from the following description, which, when taken in connection with the accompanying drawing, discloses a preferred embodiment thereof.

Referring to the drawing,

The single figure on the drawing is a flow sheet of the process embodying the present invention.

The corn is first introduced into the usual steep house, indicated on the flow sheet by reference character 11, where it is steeped for the desired or usual time and is then washed. The steep water takes up a considerable percentage of the solubles and is delivered out through a line, indicated at 12, for evaporation in pans or otherwise. After washing, the corn from which most of the steep water has been removed is delivered by a line 13 for breaking up in an attrition mill 14 (identified on the flow sheet as a Foos mill). In this mill the corn is broken sufficiently to permit separation of most of the germs. From the mill 14 the corn passes by a line 15 into a germ separator 16 wherein such germs as have been liberated from the corn are floated off for delivery to a germ washing system to be presently described. The remainder of the corn from the separator is delivered by a line 17 into a separator reel 18 in which such starch and gluten as have been separated are removed.

The partially degerminated corn is delivered from the separator reel 18 by a line 19 to a second attrition (Foos) mill 21 where the corn is further broken up to permit removal of the remaining germs. These germs with the residual fiber and starch constituents are delivered through a line 22 into a second germ separator 23 from which the remaining germs are floated off.

From the separator 23 the starch bearing material is delivered by a line 24 to a second starch separator reel 25 for removal of existent free starch and gluten. From the reel 25 the remaining starch bearing materials are carried by a line 26 to a grinding mill 27 (identified on the flow sheet as a Buhr mill), where they are finely broken up and delivered through a line 28 successively to two series of separators for removing, first, the coarser fibrous materials and bran (together called coarse slops) and then for removing the finer bran and fibers (called fine slops).

The series of separators are indicated respectively by reference characters 29 and 31. In these two series of separators the corn bearing material is serially treated with attendant removal of starch and gluten.

As will be presently more fully explained, a counterflow of water is provided to advance the starch nearing materials successively through the separating units. The starch milk from which the germs and the slops have been separated is next delivered to a water extractor 32 in which the water, which has been carrying the starch and gluten, is extracted and the starch and gluten mixture washed and filtered.

The starch which has been separated out at the separators 18 and 25 is conveyed by pipes 33 and 34 into a pipe 35 leading to a shaker separator 36. From this separator the starch milk is conveyed by a line 37 into the shaker separator 38, which is the separator at the head of the series of fine slop separating system, and from this separator 36 the separated slops are carried by a line 39 into line 26 leading to the grinding mill 27.

All of the starch milks produced are therefore concentrated in the shaker 38 and from this shaker are delivered by a line 41 into the water extractor 32. By dewatering the starch milk in this manner the quantity of liquid water is reduced to the desired extent. As is understood in the art, the water extractor or thickener 32 may be a centrifugal separator, or a settling tank, but preferably is a filter, so that the washing and filtering of the starch and gluten may be effected easily.

The water of the starch milk is withdrawn from the water extractor 32 by a line 42 which is divided into three branches at 43. One of these branches 44 supplies water for the countercurrent flow of the fine slop system; another of these branches 45 supplies water through the countercurrent flow of the coarse slop system; and the third branch 46 supplies water for countercurrent flow through the reels 47 of the germ washing system. As will be presently more fully described, additional water is supplied into the line 42, already described, from the final starch washing apparatus.

From the head reel 48 of the germ washing system a line 49 supplies water through branches 51 and 52 into separators 16 and 23 and water also through branch 53 into line 13 arranged between the steep house and the first attrition mill.

A certain amount of starch milk is supplied from the separators 18 and 25 through a line 54 into line 49 to be delivered into the separators 16 and 23 and preserve the concentration of starch desired in the operation of these devices.

The purpose of supplying starch milk and water containing solubles into the germ separating apparatus is to provide desired Baumé for the flotation of the germs from the remainder of the corn.

A line 55 leads from the first reel of the fine slop series 31 to three branches 56, 57 and 58 for delivery of an amount of starch milk into the second attrition mill 21 and into the separators 16 and 23 respectively to supplement the starch milk delivery through line 49. The remainder of the water coming from the germ washing system is delivered through the line 59 into line 55.

A part of the overflow from the water extractor is conveyed by line 61 leading from line 42 into the steeps for use in steeping the corn and final exit out to the evaporating pans. Other incidental lines or conduits are put in to convey the waters between the various units of the system as may be required and as indicated on the flow sheet, the foregoing being thought sufficient to describe generally the extraction of the water from the starch milk at the extractor 32.

In the operation of so much of the apparatus as has already been described, the major portion of the solubles is carried by the overflow back into the system finally leaving it by line 61 through the steeps into evaporating pans through line 12. The remaining portion of the soluble ingredients may be and preferably is removed in the washing apparatus contained in the thickener or filter 32. Fresh water is introduced into this unit by a line 71 and the wash water removed from the filter through a line 72 is delivered into line 42 as indicated upon the flow sheet. The washed and dried mixture of starch and gluten is next delivered into a repulping device, called a breaker on the flow sheet, indicated by reference character 73.

The repulping device is located in a closed water circulating system which comprises starch tables 74, on which the starch and gluten are separated, a gluten settler 75 and a gluten filter 70 in which the gluten is separated from the water, and pipe lines, including a line 76 leading from the repulping apparatus to the tables 74, and a line 77 leading from the tables 74 into the gluten settler 75 and a line 78 leading from the gluten settler into the repulping apparatus. The water from the gluten filter joins line 91 and is carried back to line 78 along with make-up water from the starch washing system as will afterwards be referred to. The water is caused to flow through this circuit and the gluten settler water is thus used to deposit the starch upon the tables and to float off the gluten into the gluten settlers.

The starch is flushed from the tables with fresh water and preferably by a loop system which delivers the water after use up into the mill house and to the steeps. This system comprises a line 79 delivering fresh water to a filter 81 and line 82 delivering the filtrate across the tables 74 for flushing, a line 83 leading from the tables to a shaker 84, and a line 85 leading through the filter 81, this last carrying the starch into the filter for filtration. The grits taken from the shaker 84 and a percentage of the water are delivered by a line 86 up for return into the fine slop system through line 37.

A line 87 conveys a part of the filtrate of the filter 81 to a check filter 88 and the filtrate from this filter is carried by a line 89 up to lines 42 and 72 for delivery to the steeps and to the mill house. A line 91 is provided between the lines 89 and 78 in order to supply make-up water into the gluten starch separating system as may be required.

The make-up water for the circulating system, which includes the separation of the germs from the corn and the removal of the coarse and fine slops in the coarse and fine slop systems, is provided through the line 72 from the thickener or filter 32 and the line 89 supplying some of the water derived from the final filtering of the starch. These waters enter the coarse and fine slop systems just ahead of the final reels which deliver the coarse and fine slops and are thereafter passed through the earlier acting separating reels of the system.

It will be manifest that the circulation of water around through the fine and coarse slop systems is wholly independent from the circulation of water over the tables and accordingly is subject to separate concentration controls and to separate control of temperature and of sulphur dioxide concentration. Each system may be adjusted in each of these regards as is most advantageous or calculated to produce best efficiency of action and economy of operation.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The process of manufacturing starch from corn, which comprises removing the slops and a major portion of the solubles from the gluten and starch by the use of water, dewatering the gluten and starch, washing the dewatered gluten and starch, introducing the starch and gluten into a closed continuous flow of water passing over a table on which the starch separates from the water, and flushing the starch from said table with water, taking up any residual solubles and filtering, the removal of the starch from the table and the filtering being accomplished by a stream of water entering the filter thence passing over the tables and back through the filter.

2. The process of manufacturing starch from corn, which comprises removing the slops and a major portion of the solubles from the gluten and starch by the use of water, dewatering the gluten and starch, washing the gluten and starch, introducing the starch and gluten into a closed continuous flow of water passing over a table on which the starch separates from the gluten and through a settler in which the gluten separates from the water, and flushing the starch from said table with water taking up any residual solubles, and filtering, the removal of the starch from the table and the filtering being accomplished by a stream of water entering the filter thence passing over the tables and back through the filter, and thereafter using the last mentioned water in the separation of the starch and gluten from the slops.

3. In the process of recovering starch and other products from corn in which the corn is steeped, cracked, degerminated by starch milk flotation, subjected to a washing process for removal of fibrous materials, tabled for separation of the starch from the gluten, and the gluten is dewatered, the improvement which comprises combining the starch milk obtained from the flotation system for removal of germs with the starch milk from the washing step for removal of fibrous materials, dewatering the resultant starch-gluten mixture, washing the dewatered starch gluten mixture, steeping additional corn with the water from said mixture, and adding to the dewatered starch-gluten mixture the water which is separated from the gluten.

4. The process of recovering starch and other products from corn, which comprises steeping the corn in water, cracking the steeped corn, removing the germs from the cracked corn by starch milk flotation, grinding the degerminated corn, separating the fibrous constituents of the corn from the starch-gluten mixture thereof by water washing, mixing the starch-gluten mixtures from the germ flotation with the starch-gluten mixture separated from said fibrous constituents, dewatering said starch-gluten mixtures, washing the dewatered starch-gluten mixtures, steeping additional corn with the water from said starch-gluten mixtures, adding water to said starch-gluten mixtures, separating the starch from said starch-gluten mixtures, separating the water from said gluten, and adding said separated water to the dewatered starch-gluten mixtures.

5. The process of recovering starch and other products from corn, which comprises steeping the corn, cracking the steeped corn, removing the germs from the cracked corn by starch milk flotation, grinding the corn, separating the fibrous constituents of the corn from the starch-gluten mixture therein, dewatering and washing the starch-gluten mixture, washing said germs and said fibrous constituents with the water obtained thereby, adding water to the dewatered starch-gluten mixture, separating the starch from said mixture, washing said starch, steeping additional corn with said starch wash water and with the water obtained from said dewatered starch-gluten mixture, dewatering said gluten, and adding the water from said gluten to the dewatered starch-gluten mixture.

6. The process of recovering starch and other products from corn, which comprises steeping the corn, cracking the steeped corn, separating the germs from the cracked corn by starch milk flotation, grinding the corn, separating the fibrous material from the ground corn by water washing, dewatering and washing the starch-gluten mixture obtained by said operations, returning the water obtained thereby to said operations, adding additional water to the dewatered starch-gluten mixture, separating the starch from the rewatered starch-gluten mixture, dewatering the gluten, employing the water obtained from said gluten as said additional water for the starch-gluten mixture, washing said starch, and passing a portion of the starch wash water into the process ahead of the dewatering step for the starch-gluten mixture.

7. The process of recovering starch from corn, which comprises steeping the corn, cracking the steeped corn, separating the germs from the cracked corn by starch milk flotation, grinding the corn, separating the fibrous materials from the ground corn by water-washing to form additional starch milk, dewatering and washing said starch milks to form a starch gluten mixture, and introducing said dewatered and washed starch-gluten mixture into a closed flow of water in which the starch and gluten are separated from each other, the water is separated therefrom, and the separated water is added to additional quantities of said starch-gluten mixture.

8. The process of recovering starch and other products from corn, which comprises steeping the corn, subjecting the steeped corn to degermination by starch-milk flotation, subjecting the degerminated corn to a washing operation to produce a starch-gluten suspension in water, dewatering the starch-milk from the flotation and the starch-gluten suspension, subjecting the dewatered materials to a washing operation with fresh water, subjecting said materials to an operation for removal of starch therefrom and to produce a water suspension of gluten, dewatering said water suspension of gluten and adding the water therefrom to said washed materials.

9. The process of recovering starch and other products from corn by the wet milling method, which comprises steeping the corn, subjecting the steeped corn to a series of washing operations for the production of a starch-gluten suspension in water, dewatering said suspension, washing the dewatered suspension with fresh water, subjecting the washed materials to a separating operation in water for removal of starch therefrom and for producing a water suspension of gluten, dewatering the gluten, and returning the water from said gluten to said separating operation.

ROBERT EDMAN GREENFIELD.